United States Patent [19]

Taljan et al.

[11] Patent Number: 5,356,973
[45] Date of Patent: Oct. 18, 1994

[54] AQUEOUS BASED COATING COMPOSITIONS HAVING IMPROVED METALLIC PIGMENT ORIENTATION

[75] Inventors: Dennis Taljan, North Ridgeville, Ohio; James E. Poole, Gibsonia; Marvis E. Hartman, Pittsburgh, both of Pa.

[73] Assignee: PPG Industries, Inc., Pittsburgh, Pa.

[21] Appl. No.: 938,912

[22] Filed: Aug. 31, 1992

[51] Int. Cl.$^5$ ............................................. C08K 5/11
[52] U.S. Cl. .................................... 524/314; 524/458; 524/460; 524/813
[58] Field of Search ............... 524/460, 458, 813, 314

[56] References Cited

U.S. PATENT DOCUMENTS

| | | |
|---|---|---|
| 4,403,003 | 9/1983 | Backhouse . |
| 4,458,054 | 7/1984 | Schmozer et al. ............... 525/327.3 |
| 4,681,811 | 7/1987 | Simpson et al. . |
| 4,822,685 | 4/1989 | Perez et al. . |
| 5,071,904 | 12/1991 | Martin et al. . |
| 5,100,735 | 3/1992 | Chang . |

FOREIGN PATENT DOCUMENTS

| | | |
|---|---|---|
| 026982 | 4/1980 | European Pat. Off. . |
| 082291 | 11/1982 | European Pat. Off. . |
| 315702 | 5/1988 | European Pat. Off. . |
| 3321180 | 11/1983 | Fed. Rep. of Germany . |

*Primary Examiner*—Joseph L. Schofer
*Assistant Examiner*—Jeffrey T. Smith
*Attorney, Agent, or Firm*—Linda Pingitore

[57] ABSTRACT

An aqueous based coating composition contains a polymeric film-forming resin and as an additive from about 1 to about 40 percent by weight based on the resin solids of the composition of an oligomeric ester having an acid value of from about 100 to about 500 of the structure:

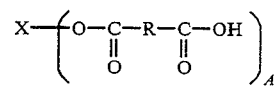

where X is the residue of a polyol containing from 1 to 50 carbon atoms per hydroxyl group after reaction with an acid or an anhydride, R is an organic moiety from the acid or anhydride and A has an average value of about 2 or greater.

The coating compositions are particularly advantageous as metallic pigmented coating compositions for automotive basecoat applications because they exhibit excellent resistance to mottling, have good flop and have reduced sensitivity to fluctuations in relative humidity.

16 Claims, No Drawings

AQUEOUS BASED COATING COMPOSITIONS HAVING IMPROVED METALLIC PIGMENT ORIENTATION

BACKGROUND OF THE INVENTION

The present invention relates to waterborne coating compositions and to methods for the preparation of multi-layered coated articles utilizing said compositions and to the resultant coated articles.

In the coating of substrates such as, for example automobiles, where a coating is desired which provides a lustrous appearance, it has been well appreciated to provide the substrate with several coating layers in order to achieve the desired effect. Therefore, typically a pigmented coating composition is first applied to the substrate followed by a transparent topcoat. By transparent is meant a clear coating, that is one which does not contain pigmentation or contains only transparent pigments. Such a coating system is commonly referred to as "clear-over-color" or "color plus clear".

Automotive coatings containing metallic pigments such as aluminum flake are generally utilized to obtain the glossy lustrous appearance which is characteristically sought. In order to achieve the preferred appearance of such metallic coating compositions it is very important that the metallic pigment orient such that it is parallel to the coated surface. The alignment of the pigment in this fashion provides for the most desirable appearance, especially with respect to the "flop" of the coating. By "flop" is meant the visual change in brightness or lightness of the metallic aluminum flake with a change in viewing angle, that is, a change from 90 to 180 degrees. The greater the visual change from light to dark appearance, the better the flop. The flop accentuates the lines and curves of an automobile; therefore, it is very important in achieving the sought after appearance of the coating. It is also very important that the metallic pigment be uniformly oriented across the surface of the substrate, otherwise blotchy areas of light and dark color will be evident. This condition is commonly known as mottling.

Over the past several years the trend in the automotive industry has been to reduce atmospheric pollution caused by the volatile solvents which are emitted during the painting process. One approach to emissions control has been the use of waterborne coating compositions as the pigmented color coat in the "color plus clear" system.

Waterborne coating compositions, however, are not without attendant disadvantages. For example, such coatings often have a narrow application window in which excellent film properties are obtained. That is, it is difficult to obtain smooth films, free of solvent popping over a wide range of relative humidities. In addition, at high humidities, mottling of the film is frequently observed.

It is desirable, therefore, to have waterborne coating compositions which have excellent resistance to mottling and popping, have good flop, and also have reduced sensitivity to fluctuations in relative humidity.

SUMMARY OF THE INVENTION

In accordance with the present invention, there is provided an aqueous based coating composition containing a polymeric film-forming resin; characterized in that the aqueous based coating composition contains as an additive from about 1 to about 40 percent by weight based on the resin solids of the composition of an oligomeric ester having an acid value of from about 100 to about 500, of the structure:

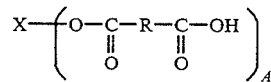

where X is the residue of a polyol containing from 1 to 50 carbon atoms per hydroxyl group, after reaction with an acid or an anhydride, R is an organic moiety from the acid or anhydride and A has an average value of about 2 or greater.

Also in accordance with the present invention there is provided a method of forming a multilayered coating on a substrate comprising:

(I) applying to the surface of the substrate as a basecoat a pigmented aqueous based coating composition containing a polymeric film-forming resin; characterized in that the aqueous based coating composition contains from about 1 to about 40 percent by weight based on the resin solids of the composition of an oligomeric ester of the structure:

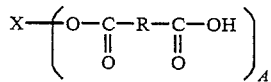

where X is the residue of a polyol after reaction with an acid or an anhydride, R is an organic moiety associated with the acid or anhydride and A has an average value of about 2 or greater;

(II) allowing the composition applied in step (I) to at least partially dry or cure to form a basecoat on the substrate surface;

(III) applying a clear film forming composition over the basecoat of step (II).

(IV) allowing the clear composition of step (III) to at least partially dry or cure to form a transparent topcoat over said basecoat.

Also provided are coated articles prepared in accordance with the aforedescribed method.

DETAILED DESCRIPTION OF THE INVENTION

The waterborne coating compositions of the present invention contain as essential components a polymeric film forming resin dispersed in aqueous medium and an oligomeric ester.

The oligomeric ester, which can be represented by the following structural formula,

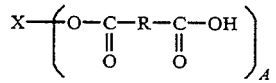

can be obtained by reaction between a polyol and an acid or an acid anhydride. When an acid anhydride is used, the acid anhydride is reacted under conditions sufficient to ring open the anhydride forming the half-ester with substantially no polyesterification occurring. By substantially no polyesterification occurring means that the carboxyl groups resulting from the anhydride ring opening do not undergo condensation polymerization. By this is meant that less than 10, usually less than 5 percent by weight of condensation polymer is formed.

Alternately, a suitable oligomeric ester can be obtained by reaction of a dicarboxylic acid with a polyol such as the reaction of adipic acid with 1-(3-hydroxy-2,2-dimethylpropyl)-3-hydroxy-2,2-dimethylpropionate. Typically the reactants are combined under conditions sufficient to effect condensation polymerization with the removal of water.

In the above formula, X is the residue of a polyol after reaction with an acid or anhydride, R is an organic moiety associated with the acid or anhydride and A has an average value of about 2 or greater preferably, the polyol contains from 1 to 50 carbon atoms per hydroxyl group. Usually A is an integer of 2 or greater.

It is believed that the molecular weight of the oligomeric ester is not critical. The preferred esters obtained in the manner described above however, are usually of low molecular weight. The oligomeric esters generally have a number average molecular weight of less than 5000, preferably from about 350 to about 1000.

The number average molecular weight is determined by gel permeation chromatography using a polystyrene standard.

In measuring the number average molecular weight using polystyrene as the standard, a Waters Associates gel permeation chromatograph Model 201 was used. Six micro-Styragel columns were used. Each column measured 30 centimeters in length and had an inside diameter of 7.8 millimeters. A differential refractometer was used as a detector, and the columns were arranged according to their pore size on the order of $10^3$, $10^4$, $10^5$, $10^6$, 500, 100 Angstroms with the $10^3$ Angstrom column being the first. Tetrahydrofuran was used as a solvent with a flow rate of 2.0 milliliters/minute. The quality of the columns is checked by their "theoretical plate number" determined from orthodichlorobenzene. For the purpose of this application, those columns with theoretical plate numbers than 3000/30 cm were used.

To determine molecular weight by gel permeation chromatography (GPC), the instrument is first calibrated using a polystyrene standard. Polystyrene standards used were purchased from Pressure Chemicals Company, Pittsburgh, Pa. The polystyrene standards have dispersities (dispersity=weight average molecular weight/number average molecular weight) ranging from 1.05 to 1.10. The viscosity average molecular weight of the polystyrene standards used were 850,000; 233,000; 474,000; 17,400 and 3,600. To obtain a calibration curve, a set of 0.1 percent (10 milligram polystyrene/1.0 ml tetrahydrofuran) polystyrene solutions in tetrahydrofuran were prepared, and a GPC chromatogram was obtained. The elution volume of each peak corresponding to a Siren molecular weight of the polystyrene standard was measured, and the data was plotted on a semilogarithmic paper (logarithm scale in the ordinate and linear scale in the abscissa). A linear least squares plot to $\log_{10}$ (molecular weight) versus elution volume in milliliters is used as a calibration curve. The lowest molecular weight of the polystyrene standard used was 3,600, and the calibration curve beyond that was extrapolated down to 100. The upper and lower exclusion limits of this set of columns are 5,000,000 and 100, respectively, in term of polystyrene molecular weight. The sample whose molecular weights are to be determined was prepared as a 1.0 percent tetrahydrofuran solution. After filtration through a 0.5 micron filter, available from Millapore Corporation, a 0.5 ml sample size was injected into the columns and a GPC chromatogram obtained under the same experimental conditions as the calibration. From the resulting calibration curve of molecular weight versus retention time, a molecular weight relative to the standard can be assigned to the retention times of the sample. The height (H) of the curve at the corresponding retention times is recorded by the computer. From these height-molecular weight (M) combinations, the following averages are calculated: Number average molecular weight=$\Sigma H/\Sigma H/M$. This is the number reported.

The oligomeric esters of the claimed invention have an acid value which generally ranges from about 100 to about 500, preferably about 150 to about 300.

The oligomeric esters are present in the claimed coating compositions in an amount ranging from about 1 percent by weight to about 40 percent by weight, preferably about 1 percent to about 25 percent, the percentages based on the resin solids of the composition.

The oligomeric ester can be prepared when an acid anhydride and polyol are contacted together usually by mixing the ingredients together in a reaction vessel. Preferably, reaction is conducted in the presence of an inert atmosphere such as nitrogen and optionally in the presence of a solvent to dissolve the solid ingredients and/or to lower the viscosity of the reaction mixture. Examples of suitable solvents are high boiling materials and include, for example, ketones such as methyl amyl ketone, diisobutyl ketone, methyl isobutyl ketone; as well as other organic solvents such as dimethyl formamide and N-methyl-pyrrolidone.

For the ring opening reaction and half-ester formation, a 1,2-dicarboxylic anhydride can be used. The reaction temperature is preferably low, that is, no greater than 135° C., preferably less than 120° C., and usually within the range of 70°–135° C., preferably 90°–120° C.

The time of reaction can vary widely depending principally upon the temperature of reaction. The reaction time can be as short as 10 minutes to as long as 24 hours.

Hydroxylic solvents such as butyl alcohol, and glycol ethers such as ethylene glycol monobutyl ether, diethylene glycol monobutyl ether, and propylene glycol monopropyl ether can be added after the reaction. Optionally the oligomeric esters can be neutralized with the addition of amine such as dimethylethanolamine and triethylamine.

The equivalent ratio of anhydride to hydroxy on the polyol is preferably at least about 0.8:1 (the anhydride being considered monofunctional) to obtain maximum conversion to the desired half-ester, although ratios less than 0.8:1 can be used.

Among the anhydrides which can be used in the formation of the desired polyesters are those which exclusive of the carbon atoms and the anhydride moiety contain from about 2 to 30 carbon atoms. Examples include aliphatic, including cycloaliphatic, olefinic and cycloolefinic anhydrides and aromatic anhydrides. Substituted aliphatic and aromatic anhydrides are also included within the definition of aliphatic and aromatic provided the substituents do not adversely affect the reactivity of the anhydride or the properties of the resultant polyester. Examples of suitable substituents are chloro, alkyl or alkoxy. Examples of anhydrides include gluteric anhydride, succinic anhydride, methylsuccinic anhydride, dodecenyl succinic anhydride, octadecenylsuccinic anhydride, phthalic anhydride, tetrahydrophthalic anhydride, methyltetrahydrophthalic anhydride, alkyl substituted phthalic anhydride, hexahydrophthalic anhydride, alkyl hexahydrophthalic anhydrides such as methylhexahydrophthalic anhydride, tetrachlorophthalic anhydride, endomethylene tetrahydrophthalic anhydride, chlorendic anhydride, itaconic anhydride, citraconic anhydride and maleic anhydride. It should be understood that mixtures of anhydrides can be used. Preferably methylhexahydrophthalic anhydride or a mixture of methylhexahydrophthalic anhydride and hexahydrophthalic anhydride are utilized.

Among the polyols which can be used are those which contain about 2 to 20 carbon atoms. Preferred are diols, triols and mixtures thereof. Examples include polyols containing from 2 to 10 carbon atoms. Examples include aliphatic polyols such as ethylene glycol, 1,2-propanediol, 1,3-propanediol, 1,4-butanediol, 1,5-pentanediol, glycerol, 1,2,3-butane triol, 1,6-hexanediol, neopentyl glycol, diethylene glycol, dipropylene glycol, 1,4-cyclohexanedimethanol, trimethylolpropane, 2,2,4-trimethyl pentane-1,3-diol, pentaerythritol a tetrol, 1-(3-hydroxy-2,2-dimethylpropyl)-3-hydroxy-2,2-dimethylpropionate. Aromatic polyols such as bisphenol A and bis(hydroxylmethyl) xylene can also be used. Preferably 1,4-cyclohexane dimethanol and 1-(3-hydroxy-2,2-dimethylpropyl)-3-hydroxy-2,2-dimethyl propionate are utilized.

Alternately a suitable oligomeric ester can be obtained by the reaction of a dicarboxylic acid with a polyol utilizing esterification by condensation, eliminating water which is removed by distillation. The reaction temperature is preferably in the range of about 120° C. to about 230° C. Among the dicarboxylic acids that can be used are aliphatic, cycloaliphatic and aromatic diacids. Examples of dicarboxylic acid that can be used include adipic acid, azelaic acid, sebacic acid, isophthalic acid, terephthalic acid, cyclohexanedicarboxylic acid and dodecanedicarboxylic acid.

Preferred oligomeric esters according to the present invention are the reaction products of 1-(3-hydroxy-2,2-dimethylpropyl)-3-hydroxy-2,2-dimethylpropionate with methylhexahydrophthalic anhydride, 1,4-cyclohexane dimethanol with a mixture of methylhexahydrophthalic anhydride and hexahydrophthalic anhydride, and 1-(3-hydroxy-2,2-dimethylpropyl)-3-hydroxy-2,2-dimethylpropionate with adipic acid.

The polymeric film-forming resin which is dispersed in the aqueous medium is preferably an aqueous dispersion of polymeric microparticles. Preferably the microparticles are crosslinked. A wide range of crosslinked polymeric microparticle dispersions are suitable for use herein including those described in U.S. Pat. No. 4,403,003 and references cited therein. In a preferred embodiment, the microparticles contain greater than 30 percent by weight based on the microparticles of a substantially hydrophobic condensation polymer having a molecular weight of greater than 300. The substantially hydrophobic polymer is essentially free of repeating acrylic or vinyl units in the backbone. Preferably the microparticles contain greater than 40 percent by weight of the substantially hydrophobic polymer, more preferably greater than 50 percent. By substantially hydrophobic is meant that upon mixing a sample of polymer with an organic component and water, a majority of the polymer is in the organic phase and a separate aqueous phase is observed. Examples of suitable condensation polymers include polyesters, polyurethanes, polyethers and alkyds which are discussed in detail below.

It should be understood that the substantially hydrophobic polymer having a molecular weight greater than 300 is adapted to be chemically bound into the cured coating composition. That is, the polymer is reactive in the sense that it contains functional groups such as hydroxyl groups which are capable of coreacting, for example, with a crosslinking agent such as a melamine formaldehyde resin which may be present in the coating composition or alternatively with other film forming resins which also may be utilized. Preferably, the polymer has a molecular weight greater than 500, more preferably greater than 800. Typically the molecular weight ranges from about 300 to about 10,000, more usually from about 300 to about 2,000. By "essentially free of repeating acrylic or vinyl units" is meant that the polymer is not prepared from typical free radically polymerizable monomers such as acrylates, styrene and the like.

As was mentioned above, the polyester, polyurethane, alkyd and polyether resins are examples of suitable substantially hydrophobic polymers. The polyester resins contain essentially no oil or fatty acid modification. That is, while alkyd resins are in the broadest sense polyester type resins, they are oil-modified and thus not generally referred to as polyester resins. The polyesters are of two kinds. One type are the unsaturated polyesters derived from unsaturated polyfunctional acids and polyhydric alcohols. Maleic acid and fumaric acid are the usual unsaturated acid components although methacrylic acid unsaturated alcohols such as trimethylolpropane mono- or diallyl esters can also be used. Commonly used polyhydric alcohols are 1,4-butanediol, 1,6-hexanediol, neopentyl glycol, ethylene glycol, propylene glycol, diethylene glycol, dipropylene glycol, butylene glycol, glycerol, trimethylolpropane, pentaerythritol and sorbitol. Often times a saturated acid will be included in the reaction to provide desirable properties. Examples of saturated acids include phthalic acid, isophthalic acid, adipic acid, azeleic acid, sebacic acid, and the anhydrides thereof. The saturated polyesters are derived from saturated or aromatic polyfunctional acids, preferably dicarboxylic acids, and mixtures of polyhydric alcohols having an average hydroxyl functionality of at least 2. Other components of polyesters can include hydroxy acid and lactones such as ricinoleic acids, 12-hydroxystearic acid, caprolactone, butyrolactone and dimethylolopropionic acid.

The alkyds are polyesters of polyhydroxyl alcohols and polycarboxylic acids chemically combined with various drying, semi-drying and non-drying oils in different proportions. Thus, for example, the alkyd resins are made from polycarboxylic acids such as phthalic acid, maleic acid, fumaric acid, isophthalic acid, succinic acid, adipic acid, azeleic acid, sebacic acid as well as from anhydrides of such acids, where they exist. The polyhydric alcohols which can be reacted with the polycarboxylic acid include 1,4-butanediol, 1,6-hexanediol, neopentyl glycol, ethylene glycol, diethylene glycol and 2,3-butylene glycol, glycerol, trimethylolpropane, trimethylolpropane, pentaerythritol, sorbitol and mannitol.

The alkyd resins are produced by reacting the polycarboxylic acid and the polyhydric alcohols together with a drying, semi-drying or non-drying oil in proportions depending upon the properties desired.

The oils are coupled into the resin molecule by esterification during the manufacturing and become an integral part of the polymer. The oil is fully saturated or predominately unsaturated. When cast into films, the fully saturated oils tend to crosslink and dry rapidly with oxidation to give more tough and solvent resistant films. Suitable oils include coconut oil, fish oil, linseed oil, tung oil, castor oil, cottonseed oil, safflower oil, soybean oil, and tall oil. Various proportions of the polycarboxylic acid, polyhydric alcohol and oil are used to obtain alkyd resins of various properties as is well known in the art.

Examples of polyether polyols are polyalkylene ether polyols which include those having the following structural formula:

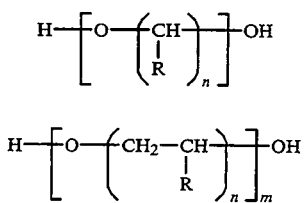

where the substituent R is hydrogen or lower alkyl containing from 1 to 5 carbon atoms including mixed substituents, and n is typically from 2 to 6 and m is from 10 to 100 or even higher. Included are poly(oxytetraethylene) glycols, poly(oxy-1,2-propylene) glycols and poly(oxy-1,2-butylene) glycols.

Also useful are polyether polyols formed from oxyalkylation of various polyols, for example, glycols such as trimethylolpropane, pentaerythritol and the like. Polyols of higher functionality which can be utilized as indicated can be made, for instance, by oxyalkylation of compounds as sorbitol or sucrose. One commonly utilized oxyalkylation method is by reacting a polyol with an alkylene oxide, for example, ethylene or propylene oxide, in the presence of an acidic or basic catalyst.

With polyether polyols, it is preferred that the carbon to oxygen weight ratio be high for better hydrophobic properties. This it is preferred that the carbon to oxygen ratio be greater than 3/1 and more preferably greater than 4/1.

The polyurethane resins can be prepared by reacting a polyol with a polyisocyanate. The reaction can be performed with a minor amount of organic polyisocyanate (OH/NCO equivalent ratio greater than 1:1) so that terminal hydroxyl groups are present or alternatively the OH/NCO equivalent ratio can be less than 1:1 thus producing terminal isocyanate groups. Preferably the polyurethane resins have terminal hydroxyl groups.

The organic polyisocyanate can be an aliphatic polyisocyanate, including a cycloaliphatic polyisocyanate or an aromatic polyisocyanate. Useful aliphatic polyisocyanates include aliphatic diisocyanates such as ethylene diisocyanate, 1,2-diisocyanatopropane, 1,3-diisocyanatopropane, 1,6-diisocyanatohexane, 1,4-butylene diisocyanate, lysine diisocyanate, 1,4-methylene bis(cyclohexyl isocyanate) and isophorone diisocyanate. Useful aromatic diisocyanates and aliphatic diisocyanates include various isomers of toluenes diisocyanate, meta-xylenediisocyanate and paraxylene-diisocyanate, also 4-chloro-1,3-phenylene diisocyanate, 1,5-tetrahydronaphthalene diisocyanate, 4,4'-dibenzyl diisocyanate and 1,2,4-benzene triisocyanate can be used. In addition the various isomers or alpha, alpha, alpha', alpha'-tetramethylxylene diisocyanate can be used. Also useful as the polyisocyanate are isocyanurates such as DESMODUR 3300 from Miles, Inc. and biurets of isocyanates such as DESMODUR NIOO from Miles, Inc.

The polyol can be polymeric such as the polyester polyols, polyether polyols, polyurethane polyols, etc., or it can be simple diol or triol such as ethylene glycol, propylene glycol, butylene glycol, glycerol, trimethylolpropane or hexanetriol. Mixtures can also be utilized.

The balance of the microparticle comprises a polymer of a vinyl monomer or mixture of vinyl monomers. These monomers are referred to herein as polymerizable species. Examples of suitable materials include acrylic monomers including alkyl esters of acrylic and methacrylic acid, such as methyl acrylate, methyl methacrylate, butyl acrylate, butyl methacrylate, 2-ethylhexyl acrylate, 2-ethylhexyl methacrylate, 2-hydroxyethyl acrylate, 2-hydroxyethyl methacrylate, hydroxypropyl methacrylate, styrene, acrylamide, acrylonitrile, alkyl esters of maleic and fumaric acid, vinyl and vinylidene halides, acrylic acid, ethylene glycol dimethacrylate, isobornyl methacrylate, vinyl acetate, vinyl ethers, allyl ethers, lauryl methacrylate, and N-butoxymethyl acrylamide. Preferably the vinyl monomer used to prepare the polymer which comprises the balance of the microparticle is selected from acrylic monomers. The polymer having a molecular weight greater than 300 is also substantially insoluble in the aqueous medium and is also capable of being dissolved in the monomer mixture which is utilized to prepare the polymer which comprises the balance of the microparticle.

The dispersion of polymeric microparticles in an aqueous medium is preferably prepared by a high stress technique which is described more fully below. First, the vinyl monomer or mixture of vinyl monomers utilized to prepare the polymer which comprises the balance of the microparticle is thoroughly mixed with the aqueous medium and the substantially hydrophobic polymer having a molecular weight greater than 300. For the present application, the vinyl monomer or mixture of vinyl monomers together with the substantially hydrophobic polymer is referred to as the organic component. The organic components generally also comprise other organic species and preferably is substantially free of organic solvent. That is, no more than 20 percent of organic solvent is present. The mixture is then subjected to stress in order to particulate it into microparticles which are uniformly of a fine particle size. The mixture is submitted to stress sufficient to result in a dispersion such that after polymerization less than 20 percent of the polymer microparticles have a mean diameter greater than 5 microns.

The aqueous medium provides the continuous phase of dispersion in which the microparticles are suspended. The aqueous medium is generally exclusively water. However, for some polymer systems, it may be desirable to also include a minor amount of inert organic solvent which can assist in lowering the viscosity of the polymer to be dispersed. For example, if the organic phase has a Brookfield viscosity greater than 1000 centipoise at 25° C. or a W Gardner Holdt viscosity the use of some solvent may be preferred. For some applications of the aqueous microparticle dispersion, for example, in its present use as a resinous binder for coating compositions, it may be desirable to have a coalescing solvent for the coating composition. One can conveniently include this coalescing solvent during the synthesis of the latex as part of the organic component. Examples of suitable water insoluble solvents which can be incorporated in the organic component are benzyl alcohol, xylene, methyl isobutyl ketone, mineral spirits, butanol, butyl acetate, tributyl phosphate and dibutyl phthalate.

As was mentioned above, the mixture is subjected to the appropriate stress by use of a MICROFLUIDIZER ® emulsifier which is available from Microfluidics Corporation in Newton, Mass. The MICROFLUIDIZER ® high pressure impingement emulsifier is patented in U.S. Pat. No. 4,533,254. The device consists of a high pressure (up to 20,000 psi) pump and an interaction chamber where the emulsification takes place. The pump forces the mixture of reactants in aqueous medium into the chamber where it is split into at least two streams which pass at very high velocity through at least two slits and collide resulting in the particulates of the mixture into small particles. Generally, the reaction mixture passed through the emulsifier once at a pressure between 5,000 and 15,000 psi. Multiple passes can result in smaller average particle size and a narrower range for the particle size distribution. When using the aforesaid MICROFLUIDIZER ® emulsifier, stress is applied by liquid-liquid impingement as has been described. However, it should be understood that if desired, other modes of applying stress to the pre-emulsification mixture can be utilized so long as sufficient stress is applied to achieve the requisite particle size distribution, that is, such that after polymerization less than 20 percent of the polymer microparticles have a mean diameter greater than 5 microns. For example, one alternative manner of applying stress would be the use of ultrasonic energy.

Stress is described as force per unit area. Although the precise mechanism by which the MICROFLUIDIZER ® emulsifier stresses the pre-emulsification mixture to particulate it is not thoroughly understood. It is theorized that stress is exerted in more than one manner. It is believed that one manner in which stress is exerted is by shear. Shear means that the force is such that one layer or plane moves parallel to an adjacent, parallel plane. Stress can also be exerted from all sides as a bulk, compression stress. In this instance stress could be exerted without any shear. A further manner of producing intense stress is by cavitation. Cavitation occurs when the pressure within a liquid is reduced enough to cause vaporization. The formation and collapse of the vapor bubbles occurs violently over a short time period and produces intense stress. Although not intending to be bound by theory, it is believed that both shear and cavitation contribute to producing the stress which particulates the pre-emulsification mixture.

Once the mixture has been particulated into microparticles, the polymerizable species within each particle are polymerized under conditions sufficient to produce polymer microparticles which are stably dispersed in the aqueous medium. It should be understood that one of the requisite conditions sufficient to achieve the stably dispersed microparticles is the presence in the reaction mixture of a surfactant which is also termed a dispersant. The surfactant is preferably present when the organic component referred to above is mixed into the aqueous medium, prior to particulation. Alternatively, the surfactant can be introduced into the medium at a point just after the particulation within the MICROFLUIDIZER ® emulsifier. The surfactant, however, can be an important part of the particle forming process and is often necessary to achieve the requisite dispersion stability. The surfactant can be a material whose role is to prevent the emulsified particles from agglomerating to form larger particles.

The same surfactants or dispersants which can be utilized during conventional emulsion polymerization are also suitable for this high stress technique. Examples of suitable surfactants include the dimethylethanolamine salt of dodecylbenzenesulfonic acid, sodium dioctylsulfosuccinate, ethoxylated nonylphenol and sodium dodecyl benzene sulfonate. Other materials well known to those skilled in the art are also suitable herein. Generally, both ionic and nonionic surfactants are used together and the amount of surfactant ranges from about 1 percent to about 10 percent, preferably from about 2 percent to about 4 percent, the percentage based on the total solids. One particularly preferred surfactant for the preparation of aminoplast curable dispersions is the dimethylethanolamine salt of dodecylbenzenesulfonic acid.

In order to conduct the free radical polymerization of the polymerizable species a free radical initiator is also required. Both water soluble and oil soluble initiators can be used. Since the addition of certain initiators, such as redox initiators, can result in a strong exothermic reaction, it is generally desirable to add the initiator to the other ingredients immediately before the reaction is to be conducted. Examples of water soluble initiators include ammonium peroxydisulfate, potassium peroxydisulfate and hydrogen peroxide. Examples of oil soluble initiators include t-butyl perbenzoate and 2,2'-azobis(isobutyronitrile). Preferably redox initiators such as ammonium peroxydisulfate/sodium metabisulfite or t-butylhydroperoxide/isoascorbic acid are utilized herein.

It should be understood that in some instances it may be desirable for some of the reactant species to be added after particulation of the remaining reactants and the aqueous medium. For example, water soluble acrylic monomers such as hydroxypropyl methacrylate.

The particulated mixture is then subjected to conditions sufficient to induce polymerization of the polymerizable species, within the microparticles. The particular conditions will vary depending upon the actual materials being polymerized. The length of time required to complete polymerization typically varies from about 10 minutes to about 6 hours.

The progress of the polymerization reaction can be followed by techniques conventionally known to those skilled in the art of polymer chemistry. For example, heat generation, monomer concentration and percent of total solids are all methods of monitoring the progress of the polymerization.

The aqueous microparticle dispersions can be prepared by a batch process or a continuous process. In one batch process the unreacted microdispersion is fed over a period of about 1 to 4 hours into a heated reactor initially charged with water. The initiator can be fed in simultaneously, it can be part of the microdispersion or it can be charged to the reactor before feeding in the microdispersion. The optimum temperature depends upon the specific initiator being used. The length of time typically ranges from about 2 hours to about 6 hours.

In an alternative batch process, a reactor vessel is charged with the entire amount of microdispersion to be polymerized. Polymerization commences when an appropriate initiator such as a radox initiator is added. An appropriate initial temperature is chosen such that the heat of polymerization does not increase the batch temperature beyond the boiling point of the ingredients. Thus for large scale production, it is preferred that the microdispersion have sufficient heat capacity to absorb the total amount of heat being generated.

In a continuous process the pre-emulsion or mixture of raw materials is passed through the homogenizer to make a microdispersion which is immediately passed through a heated tube, e.g., stainless steel, or a heat exchanger in which polymerization takes place. The initiator is added to the microdispersion just before it enters the tubing.

It is preferred to use radox type initiators in the continuous process since other initiators can produce gases such as nitrogen or carbon dioxide which can cause the latex to spurt out of the reaction tubing prematurely. The temperature of reaction can range from about 25° C. to about 80° C., preferably about 35° C. to about 45° C. The residence time typically ranges from about 5 minutes to about 30 minutes.

The tubing in which the reaction occurs is not required to heat the microdispersion but rather to remove the heat being generated. Once the initiator has been added, the reaction begins spontaneously after a short induction period and the reaction exotherm resulting from the polymerization will rapidly raise the temperature.

If there is still free monomer remaining after all of the initiator is consumed, an additional amount of initiator can be added to scavenge the remaining monomer.

Once the polymerization is complete, the resultant product is a stable dispersion of polymer microparticles in an aqueous medium, wherein both the polymer formed from the polymerizable species and the substantially hydrophobic polymer of greater than 300 molecular weight are contained within each microparticle. The aqueous medium, therefore, is substantially free of water soluble polymer. The resultant polymer microparticles are of course insoluble in the aqueous medium. In saying that the aqueous medium is substantially free of water soluble polymer, it is intended that the term "substantially free" means that the aqueous medium contains no more than 30 percent by weight of dissolved polymer, preferably no more than 15 percent.

By "stably dispersed" is meant that the polymer microparticles do not settle upon standing and do not coagulate or flocculate on standing. Typically, when diluted to 50 percent total solids the microparticle dispersions do not settle even when aged for one month at room temperature.

As was stated above, a very important aspect of the polymer microparticle dispersions is that the particle size is uniformly small, i.e., after polymerization less than 20 percent of the polymer microparticles have a mean diameter which is greater than 5 microns, more preferably greater than 1 micron. Generally, the microparticles have a mean diameter from about 0.01 microns to about 10 microns. Preferably the mean diameter of the particles after polymerization ranges from about 0.05 microns to about 0.5 microns. The particle size can be measured with a particle size analyzer such as the Coulter N4 instrument commercially available from Coulter. The instrument comes with detailed instructions for making the particle size measurement. However, briefly, a sample of the aqueous dispersion is diluted with water until the sample concentration falls within specified limits required by the instrument. The measurement time is 10 minutes.

The microparticle dispersions are high solids materials of low viscosity. Dispersions can be prepared directly with a total solids content of from about 45 percent to about 60 percent. They can also be prepared at a lower solids lever of about 30 to about 40 percent total solids and concentrated to a higher level of solids of about 55 to about 65 percent by stripping. The molecular weight of the polymer and viscosity of the aqueous dispersions are independent of each other. The weight average molecular weight can range from few hundred to greater than 100,000. The Brookfield viscosity can also vary widely from about 0.01 poise to about 100 poise, depending on the solids and composition, preferably from about 0.2 to about 5 poise when measured at 25° C. using an appropriate spindle at 50 RPM.

The microparticle dispersion can be either crosslinked or uncrosslinked. When uncrosslinked the polymer within the microparticle can be either linear or branched.

Additionally the polymeric film-forming resin of the claimed waterborne composition can be a water soluble polymer or copolymer well known to those skilled in the art.

The oligomeric ester can be incorporated into the claimed coating compositions by addition with other constituents of the coating compositions (i.e., film forming resin, crosslinking agents, pigments, etc.). The addition occurs with the coating composition under agitation. The pH is then adjusted to the normal operating range of about 8.0 to 9.0 by the addition of an amine such as dimethylethanolamine or triethylamine.

Alternately with the preferred polymeric microparticles described in detail above, although not preferred, the oligomeric ester can be incorporated during the preparation of the polymeric microparticles. Specifically, the oligomeric ester can be cold blended with the polymeric microparticles and then returned to the MICROFLUIDIZER ®. In addition the oligomeric ester can be blended with the vinyl monomer described in detail above, as a first step in the preparation of polymeric microparticles described above in detail.

The coating compositions of the claimed invention, in a preferred embodiment, additionally comprise a crosslinking agent which is adapted to cure the polymeric microparticles, such as an aminoplast crosslinker.

Aminoplast resins are based on the addition products of formaldehyde, with an amino- or amido-group carrying substance. Condensation products obtained from the reaction of alcohols and formaldehyde with melamine, urea or benzoguanamine are most common and preferred herein. However, condensation products of other amines and amides can also be employed, for example, aldehyde condensates of triazines, diazines, triazoles, guanadines, guanamines and alkyl- and aryl-substituted melamines. Some examples of such compounds are N,N'-dimethyl urea, benzourea, dicyandiamide, formaguanamine, acetoguanamine, glycoluril, anneline, 2-chloro-4,6-diamino-1,3,5-triazine, and the like.

While the aldehyde employed is most often formaldehyde, other similar condensation products can be made from other aldehydes, such as acetaldehyde, crotonaldehyde, acrolein, benzaldehyde, furfuryl, glyoxal and the like.

The aminoplast resins contain methylol or similar alkylol groups, and in most instances, at least a portion of these alkylol groups are etherified by a reaction with an alcohol to provide organic solvent soluble resins. Any monohydric alcohol can be employed for this purpose, including such alcohols as methanol, ethanol, propanol, butanol, pentanol, hexanol, heptanol and others, as well as benzyl alcohol and other aromatic alcohols, cyclic alcohols such as cyclohexanol, monoethers of glycols such as Cellosolves and Carbitols, and halogen substituted or other substituted alcohols, such as 3-chloropropanol or butoxyethanol. The preferred aminoplast resins are substantially alkylated with methanol or butanol.

The claimed coating compositions can contain, in addition to the components described above, a variety of other optional materials. As was mentioned above, if desired, other resinous materials can be utilized in conjunction with the dispersion of polymeric microparticles so long as the resultant coating composition is not detrimentally affected in terms of physical performance and properties. In addition, material such as rheology control agents, ultraviolet light stabilizers, catalysts, fillers and the like can be present.

As was mentioned above, the waterborne coating compositions of the present invention are particularly suitable as basecoating compositions in automotive color plus clear applications. For this application pigment is one of the principal ingredients. The pigments which can be utilized are of various types, depending upon whether a metallic pigment is desired. When a metallic coating is desired preferably aluminum flake is utilized. A variety of grades of aluminum flake are available such as Silberline Sparkle Silver 5000 AR, Toyo 8260 and Obron OBT 8167 STAPA M. Also chrome treated aluminum flake such as Hydrolux 400 and Ekkert 47700 can be used. Other metallic pigments include bronze flakes, coated mica, nickel flakes, tin flakes, silver flakes, copper flakes, or combination of these. Other examples of suitable pigments include mica, iron oxides, lead oxides, carbon black, titanium dioxide, talc, as well as a variety of color pigments. The specific pigment to binder ratio can vary widely so long as it provides the requisite hiding at the desired film thickness and application solids.

As automotive waterborne basecoat compositions, the compositions of the present invention are very advantageous, particularly in basecoats containing metallic pigments. The coating compositions are particularly resistant to mottling. (By "mottling" is meant the irregular orientation of metallic pigments in the deposited film causing blotchy areas of light and dark color.) The compositions have good leveling and flow characteristics and exhibit an excellent automotive quality finish which is demonstrated by the excellent flop of the coating. The compositions also have low volatile organic content. Generally the volatile organic content is less than 3.5 pounds per gallon. In addition, the claimed coating compositions used as basecoats are very versatile and can be utilized with a variety of clear coating compositions as topcoats including solvent borne clear coats, waterborne clear coats and powder clear coats.

The claimed coating compositions can be applied by conventional means including brushing, dipping, flow coating, spraying and the like, but they are most often applied by spraying. Conventionally known spray techniques and equipment for air spraying and electrostatic spraying and either manual or automatic methods can be used.

During application of the basecoat composition to the substrate, a film of the basecoat is formed on the substrate. Typically, the basecoat thickness will be about 0.01 to 5 mils, preferably 0.1 to 2 mils in thickness.

After application to the substrate of the base coat composition, a film is formed on the surface of the substrate. This is achieved by driving solvent, i.e., organic solvent and water, out of the base coat film by heating or simply by an air-drying period. Preferably, the heating step will be for a period to insure that the top coat composition can be applied to the base coat without the former dissolving the base coat composition, i.e., "striking in". Suitable drying conditions will depend on the particular base coat composition, on the ambient humidity with certain waterbased compositions, but in general a drying time of from about 1 to 5 minutes at a temperature of about 100° to 250° F. (39° to 121° C.) will be adequate to insure that mixing of the two coats is minimized. At the same time, the base coat film is adequately wetted by the top coat composition so that satisfactory intercoat adhesion is obtained. Also, more than one base and multiple top coats may be applied to develop the optimum appearance. Usually between coats, the previously applied base coat or top coat is flashed, that is, exposed to ambient conditions for about 1 to 20 minutes. The clear top coat composition can be applied to the basecoated substrate by any of the conventional coating techniques described above in connection with the basecoat, but it is preferred that spray applications be used since this gives the best gloss.

After application of the top coat composition to the base coat, the coated substrate is heated to cure the coating layers. In the curing operation, the film-forming material of the top coat and/or of the base coat is crosslinked with the aid of any crosslinking agents present. The heating or curing operation is usually carried out at a temperature in the range of from 160°–350° F.(71°–177° C.) but if needed lower or higher temperatures may be used depending upon whether it is sufficient to activate any necessary crosslinking mechanisms.

It should be understood that for the purposes of the present invention the term "curing" also includes drying without any externally added crosslinking agent.

The thickness of the topcoat is usually from about 0.5 to 5, preferably 1.2 to 3 mils.

The invention will be further described by reference to the following examples. Unless otherwise indicated, all parts are by weight.

EXAMPLE I

A polyurethane acrylate was prepared from the following ingredients:

| Amount (g) | Material |
| --- | --- |
| 1000 | poly(neopentyl glycol adipate) having number average molecular weight of 1000, commercially available as FORMREZ 55-112 (Witco) |
| 116 | hydroxyethyl acrylate (HEA) |
| 1.4 | dibutyltin dilaurate |
| 1.4 | butylated hydroxytoluene |
| 244 | tetramethyl xylene diisocyanate (TMXDI) |
| 340 | butyl acrylate (BA) |

The first four ingredients were stirred in a flask as the TMXDI was added over a one hour period at a temperature of 70°–76° C. 90 g of the butyl acrylate was used to rinse the addition funnel containing the TMXDI and the temperature of the mixture was then held at 70° C. for an additional 2 hours as all the isocyanate reacted. The remainder of the butyl acrylate was added to produce an 80% solution with a Gardner-Holdt viscosity of X, an acid value of 0.8, and a hydroxyl value of 29.

A pre-emulsion was prepared by stirring together the following ingredients:

| Amount (g) | Material |
| --- | --- |
| 750.0 | polyurethane prepolymer from above |
| 110.0 | methyl methacrylate (MMA) |
| 90.0 | butyl acrylate (BA) |
| 30.0 | ethylene glycol dimethacrylate (EGDMA) |
| 20.0 | acrylic acid (AA) |
| 33.3 | ALIPAL Co-436 (60% solution of ammonium nonylphenol tetra-ethyleneoxy sulfate, available from the GAF Corporation) |
| 29.9 | PGNP-15 (polyglycidyl nonylphenol, available from the Dixie Chemical Co.) |
| 13.3 | AEROSOL OT-75 (75% solution of sodium dioctyl sulfosuccinate available from American Cyanamid) |
| 5.9 | 70% solution of dodecylbenzenesulfonic acid |
| 1.4 | N,N-dimethyl ethanolamine (DMEA) |
| 2.0 | 1% aqueous solution of ferrous ammonium sulfate (FAS) |
| 0.12 | FOAMKILL 649 |
| 700.0 | water |

The pre-emulsion was passed twice through a M110 Microfluidizer ® at 8000 psi to produce a bluish-white emulsion. The emulsion was transferred to a fourneck round bottom flask equipped with a thermometer, mechanical stirrer, condenser and a nitrogen line. The polymerization was initiated by adding first a mixture of 1.5 g isoascorbic acid dissolved in 350 g water followed by a solution of 1.5 g 35% hydrogen peroxide in 250 g water added over a fifteen minute period. The temperature of the emulsion went from 24° C. to 59° C. The pH of the latex was adjusted from 3.6 to 8.2 by the addition of 41.0 g of a 33% solution of aqueous DMEA. Finally, 1.9 g of Proxel GXL (biocide available from ICI) dissolved in 13 g of water was added. The total solids of the latex was 42.9% and the Brookfield viscosity (50 rpm, #1 spindle) was 31 cps.

EXAMPLE A

A polyacid half-ester of 1-(3-hydroxy-2,2-dimethylpropyl)-3-hydroxy-2,2-dimethylpropionate (Ester Diol 204) and methylhexahydrophthalic anhydride (ED 204/MHHPA) was prepared from the following mixture of ingredients:

| Ingredients | Parts by Weight (in grams) |
| --- | --- |
| Ester Diol 204 | 2550.0 |
| Methylhexahydrophthalic anhydride | 4116.0 |
| Methyl isobutyl ketone | 1466.5 |
| Ethanol | 666.6 |

The Ester Diol 204 and 1466.5 grams of the methyl isobutyl ketone were charged to a reaction vessel and heated under a nitrogen atmosphere to 115° C. The methylhexahydrophthalic anhydride was added over a 90-minute period. The reaction mixture was then held at to 115° C. for four hours. The reaction mixture was then cooled to 100° C. followed by the addition of ethanol (to react with residual anhydride) and heating the reaction mixture to reflux and holding for two hours. The reaction mixture was stripped to a pot temperature of 125° C. The reaction mixture was then adjusted to 80 percent solids with methyl isobutyl ketone.

EXAMPLE B

A polyacid half-ester of di-trimethylolpropane and methylhexahydrophthalic anhydride (di-TMP/MHHPA) was prepared from the following mixture of ingredients:

| Ingredients | Weight in grams |
| --- | --- |
| Di-Trimethylolpropane | 1584.8 |
| Methylhexahydrophthalic anhydride | 4120.7 |
| Methyl isobutyl ketone | 570.5 |
| n-Propyl alcohol | 2114.4 |

The di-trimethylolpropane and 540.5 grams of methyl isobutyl ketone were charged to a reaction vessel and heated under a nitrogen atmosphere to 115° C. The methylhexahydrophthalic anhydride was added over a period of about 2 hours at 115° C. The remainder of the methyl isobutyl ketone was added as a rinse. The reaction was held at 115° C. for 4 hours. The reaction mixture was then cooled to 100° C., and the n-propyl alcohol was added. The reaction mixture was then heated to 105° C. and held for 2 hours and then cooled to room temperature. The reaction mixture had a solids content of 72.3 percent and an acid value of 163.

EXAMPLE C

A polyacid half-ester (TMP/MHHPA) of trimethylolpropane and methylhexahydrophthalic anhydride was prepared from the following mixture of ingredients:

| Ingredients | Weight in grams |
| --- | --- |
| Trimethylolpropane | 588.1 |
| Methylhexahydrophthalic anhydride | 2208.5 |
| Methyl isobutyl ketone | 1198.4 |
| Ethyl alcohol | 279.2 |

The trimethylolpropane and 1065.4 grams of methyl isobutyl ketone were charged to a reaction vessel and heated under a nitrogen atmosphere to 115° C. The methylhexahydrophthalic anhydride was added over a period of about 2 hours at 115° C. The remainder of the methyl isobutyl ketone was added to the rinse. The reaction was held at 115° C. for 4 hours. The reaction mixture was then cooled to 100° C., and the ethyl alcohol was added. The reaction mixture was then heated to 105° C. and held for 2 hours and then stripped to a reaction temperature of 125° C. to remove the ethyl alcohol. A total of 495 grams of solvent was removed. The reaction mixture was cooled to room temperature and 215 grams of methyl isobutyl ketone was added to the reaction mixture to adjust solids to about 70 percent. The reaction mixture had a solids content of 69.9 percent and an acid value of 190.

EXAMPLE D

A polyacid half-ester of neopentyl glycol and methylhexahydrophthalic anhydride (NPG/MHHPA) was prepared from the following mixture of ingredients:

| Ingredients | Weight in grams |
| --- | --- |
| Neopentyl glycol | 1300.0 |
| Methylhexahydrophthalic anhydride | 4116.0 |

| Ingredients | Weight in grams |
| --- | --- |
| Methyl isobutyl ketone | 2321.1 |
| Ethyl alcohol | 541.6 |

The neopentyl glycol and 2121.1 grams of methyl isobutyl ketone were charged to a reaction vessel and heated under a nitrogen atmosphere to 115° C. The methylhexahydrophthalic anhydride was added over a period of about 2 hours at 115° C. The remainder of the methyl isobutyl ketone was added as a rinse. The reaction was held at 115° C. for 4 hours. The reaction mixture was then cooled to 100° C., and the ethyl alcohol was added. The reaction mixture was then heated to 105° C. and held for 2 hours and then stripped to a reaction temperature of 125° C. to remove the ethyl alcohol. A total of 1054.8 grams of solvent was removed. The reaction mixture was cooled to room temperature and 513 grams of methyl isobutyl ketone was added to the reaction mixture to adjust solids to about 70 percent. The reaction mixture had a solids content of 69.9 percent and an acid value of 188.

EXAMPLE E

A polyacid half-ester of 1,4-cyclohexanedimethanol with a mixture of methylhexahydrophthalic anhydride and hexahydrophthalic anhydride (1,4-CHDM/HHPA/MHHPA) was prepared from the following mixture of ingredients:

| Ingredients | Parts by Weight (in grams) |
| --- | --- |
| 1,4-cyclohexanedimethanol | 216.0 |
| hexahydrophthalic anhydride | 143.2 |
| methylhexahydrophthalic anhydride | 338.1 |
| butyl CELLOSOLVE (trademark Union Carbide) | 232.4 |
| deionized water | 211.4 |
| dimethylethanolamine | 253.6 |

The cyclohexanedimethanol and hexahydrophthalic anhydride were charged to a reaction vessel and heated under nitrogen atmosphere to 115° C. The methylhexahydrophthalic anhydride was added over a period of about two hours at 115° C. The reaction mixture was then held at 115° C. for four hours. The reaction mixture was then cooled to 100° C. followed by the addition of butyl CELLOSOLVE and a mixture of deionized water and dimethylethanolamine and then cooled to room temperature. The reaction mixture had a solids content of 51.5% and an acid value of 113.1.

EXAMPLE F

A polyacid half-ester of 1-(3-hydroxy-2,2-dimethylpropyl)-3-hydroxy-2,2-dimethyl propionate (Ester Diol 204) and adipic acid (ED-204/Adipic Acid) was prepared from the following mixture of ingredients:

| Ingredients | Parts by Weight (in grams) |
| --- | --- |
| Ester Diol 204 | 614.4 |
| Adipic acid | 876.0 |
| Hypophosphorous acid | 0.3 |
| Xylene | 263.0 |
| Butyl CELLOSOLVE | 691.1 |
| Deionized water | 848.2 |
| Dimethylethanolamine | 534.0 |

The Ester Diol 204, adipic acid, hypophosphorous acid and xylene were charged to a reaction vessel and fitted with a reflux condenser and a Dean-Stark trap filled with xylene. The reaction mixture was heated under nitrogen to reflux and held at reflux while removing water until an acid value of 204 was reached. The reaction mixture was then cooled to 125° C. and stripped to 100% total solids. The reaction mixture was then cooled to 90° C. followed by the addition of butyl cellosolve and a mixture of deionized water and dimethylethanolamine and cooled to room temperature. The reaction mixture had a solids content of 40.4% and an acid value of 99.8.

EXAMPLE G

A polyacid half-ester pentaerythritol and methylhexahydrophthalic anhydride (PE/MHHPA) was prepared from the following mixture of ingredients:

| Ingredients | Parts by Weight (in grams) |
| --- | --- |
| pentaerythritol | 1089.3 |
| methylhexahydrophthalic anhydride | 5274.4 |
| butyl acetate | 1257.8 |
| n-propanol | 1736.9 |

The pentaerythritol and butyl acetate were charged to a reaction vessel and heated under nitrogen atmosphere to 100° C. The methylhexahydrophthalic anhydride was added over a period of about two hours at 100° C. The reaction mixture was then held at 115° C. for four hours. The reaction mixture was then cooled to 100° C. followed by the addition of n-propanol. The reaction mixture was then heated to 105° C. The reaction mixture was then cooled to room temperature. The reaction mixture had a solids content of 72.3% and an acid value of 189.8.

EXAMPLE II

An aqueous coating composition for evaluation of each of the oligomeric esters was prepared in the following manner:

An aluminum pigment paste was prepared by mixing together the following:

| Amount (g) | Material |
| --- | --- |
| 26.3 | ethylene glycol monohexyl ether |
| 4.0 | propylene glycol monopropyl ether |
| 14.3 | poly(propylene glycol) of molecular weight 425 |
| 3.6 | U.V. absorber (TINUVIN 130 from Ciba Geigy Corp.) |
| 0.7 | phosphatized epoxy* |
| 34.8 | treated aluminum pigment (HYDROLUX 400 from Obron Corp.) |
| 53.3 | CYMEL 385 (aminoplast resin from |

| Amount (g) | Material |
|---|---|
| | American Cyanamid) |

*The phosphatized polyepoxide was prepared in the following manner: A mixture of 266.7 g of 85% phosphoric acid and 344.4 g of ethylene glycol n-butyl ether was heated to 110° C. under nitrogen atmosphere. A solution of 1105.0 g of EPON 828 (a diglycidyl ether of bisphenol A which is commercially available from Shell Chemical Company), 545.2 g of ethylene glycol n-butyl ether, 38.2 g of xylene and 1.10 g of ethyltriphenyl-phosphonium iodide (commercially available from Morton Thiok ol Company) was added to the phosphoric acid solution over a two hour period. Then 52.6 g of ethylene glycol n-butyl ether was used to rinse the addition funnel and added to the solution. The solution was held at 110° C. for an additional 2 hours and 44.0 g of additional ethylene glycol n-butyl ether were added. The final product had a total solids content of 61.5%, a Gardner Holdt viscosity of X, and a milliequivalents of acid per grams of 1.650.

The aforesaid ingredients were stirred for 15 minutes and allowed to stand for one hour.

The latex prepared in Example I, above, was neutralized to a pH of about 8.8 as follows:

| Amount (g) | Material |
|---|---|
| 88.7 | latex of Example I |
| 1.2 | 50 percent solution of dimethylethanolamine in deionized water |
| 7.2 | aliphatic hydrocarbons (SHELL SOL 71) |
| 8.4 | diethylene glycol monobutyl ether |
| 41.3 | deionized water |
| 8.4 | propylene glycol monopropyl ether |

The coating composition was prepared by combining together the aluminum pigment paste and neutralized latex.

Each of the oligomeric esters described in Examples A through G, above was evaluated in the aforedescribed coating composition. Each of the esters was added to the coating composition in an amount of 20 weight percent based on resin solids with agitation. The pH was then adjusted to 8.8 by adding an appropriate amount of a 50 percent solution of dimethylethanolamine in deionized water.

Each of the coating compositions had spray solids of about 32 percent and a spray viscosity (number 4 Ford cup) of 24 to 26 seconds.

The pigmented coating composition was evaluated for use as a basecoating composition over cold rolled steel treated with BONDERITE 40, commercially available from ACT and electrocoated with cationically electrodepositable primer commercially available from PPG Industries, Inc. as ED-11.

The ED-11 coated panels, which were 12"×18" (30.5 cm×45.7 cm) in size, were primed with a commercially available PPG European primer surfacer coded E 730G305. This primer surfacer was cured for 25 minutes at 329° F. (165° C.).

The basecoat was spray applied to the primed substrate at 60% relative humidity; 75° F.-80° F. (24° C.-27° C.) using a Devilbiss spray gun using an AV1915 FX needle and 797 air cap with a 250 cc/minute fluid delivery rate and flash baked 5 minutes at 200° F. (93° C.). The basecoat film thickness ranged between 0.5-1.0 mils (12.7-25.4 microns).

The basecoated panels were cured for 30 minutes at 250° F. (121° C.). The cured film was evaluated by visual inspection for areas of lightness and darkness, also known as striping or mottling. In addition, brightness of face and face/flop properties were also visually inspected.

The results appear in the table below:

| Oligomeric Ester Additive | Visual Mottling Rating |
|---|---|
| none | — |
| ED-204/MHHPA of Example A | ++ |
| Di-TMP/MHHPA of Example B | + |
| TMP/MHHPA of Example C | + |
| NPG/MHHPA of Example D | + |
| 1,4-CHDM/HHPA/MHHPA of Example E | ++ |
| ED-204/Adipic Acid of Example F | ++ |
| PE/MHHPA of Example G | + |

++: complete elimination of mottling and striping
excellent face/flop
very bright face, very chromatic
+: very slight mottling and striping
improved face/flop
bright face
—: severe mottling and striping
average face/flop
average face brightness

We claim:

1. An aqueous based coating composition containing a polymeric film forming resin; characterized in that the aqueous based coating composition contains as an additive from about 1 to about 40 percent by weight based on resin solids of the composition of an oligomeric ester having an acid value of from about 100 to about 500 of the structure

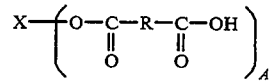

where X is the residue of a polyol containing from 1 to 50 carbon atoms per hydroxyl group after reaction with an acid or an anhydride, R is an organic moiety from the acid or anhydride, and A has an average value of 2 or greater.

2. The coating composition of claim 1 which contains from about 1 to about 25 percent by weight of the oligomeric ester.

3. The coating composition of claim 1 in which the polyol is selected from the group consisting of 1-(3-hydroxy-2,2-dimethyl propyl)-3-hydroxy-2,2-dimethylpropionate, 1,4-cyclohexanedimethanol, trimethylolpropane, di-trimethylolpropane, neopentylglycol, 1,4-butanediol, 1,6-hexanediol, and pentaerythritol.

4. The coating composition of claim 1 in which R is from an aromatic or cycloaliphatic anhydride containing from 2 to 30 carbon atoms.

5. The coating composition of claim 4 in which R is from a polycarboxylic acid anhydride selected from the group consisting of alkyl substituted phthalic anhydride, hexahydrophthalic anhydride, and alkyl substituted hexahydrophthalic anhydride.

6. The coating composition of claim 1 wherein the oligomeric ester is the reaction product of 1-(3-hydroxy-2,2-dimethylpropyl)-3-hydroxy-2,2-dimethylpropionate and methyl hexahydrophthalic anhydride.

7. The coating composition of claim 1 wherein the oligomeric ester is the reaction product of cyclohexanedimethanol 1,4 and a mixture of methylhexahydrophthalic anhydride and hexahydrophthalic anhydride.

8. The coating composition of claim 1 wherein the oligomeric ester is the reaction product of 1-(3-hydroxy-2,2-dimethylpropyl)-3-hydroxy-2,2-dimethyl propionate and adipic acid.

9. The coating composition of claim 1 in which the film-forming resin contains functional groups which are capable of reacting with a crosslinking agent.

10. The coating composition of claim 9 which contains a crosslinking agent.

11. The coating composition of claim 10 wherein the crosslinking agent is an aminoplast resin.

12. The coating composition of claim 1 wherein the volatile organic content is less than 3.5 pounds per gallon.

13. The coating composition of claim 1 wherein the film-forming resin is a latex which comprises polymeric microparticles prepared by forming a mixture in aqueous medium of a vinyl monomer or mixture of vinyl monomers with greater than 30 percent by weight of a substantially hydrophobic polymer; the percent by weight being based on weight of vinyl monomer(s) and hydrophobic polymer; said polymer being essentially free of repeating acrylic or vinyl units in the polymer backbone and having a molecular weight of greater than 300, and particularizing the mixture into microparticles by high stress techniques followed by polymerizing the vinyl monomer(s) to form the microparticles which are stably dispersed in the aqueous medium.

14. The coating composition of claim 13 wherein the hydrophobic polymer is a polyester or polyurethane.

15. The coating composition of claim 13 wherein the microparticles are crosslinked.

16. The coating composition of claim 13 which contains a crosslinking agent.

* * * * *